United States Patent [19]

Morisawa et al.

[11] Patent Number: 5,034,824
[45] Date of Patent: Jul. 23, 1991

[54] CIRCUIT ELEMENT MOUNTING STRUCTURE FOR ELECTRONIC STILL CAMERA

[75] Inventors: Tahei Morisawa; Harumi Aoki; Yuichi Kurosawa, all of Tokyo, Japan

[73] Assignee: Asahi Kogaku Kogyo K.K., Tokyo, Japan

[21] Appl. No.: 409,367

[22] Filed: Sep. 19, 1989

[30] Foreign Application Priority Data

Oct. 4, 1988 [JP] Japan ............................ 63-130182[U]

[51] Int. Cl.$^5$ ............................................ H04N 5/781
[52] U.S. Cl. ..................................... 358/335; 358/906; 358/909; 358/229; 360/133; 361/331
[58] Field of Search ............... 358/335, 906, 909, 229; 360/132, 134, 90, 35.1, 133, 135; 361/331, 422

[56] References Cited

U.S. PATENT DOCUMENTS 4,511,944  4/1985  Saito ........................................ 360/133
4,530,015  7/1985  Yanagida et al. ................. 358/335 X

FOREIGN PATENT DOCUMENTS 2101391A  1/1983  United Kingdom .

Primary Examiner—Robert L. Richardson
Attorney, Agent, or Firm—Sughrue, Mion, Zinn Macpeak & Seas

[57] ABSTRACT

A circuit element mounting structure for an electronic still camera having a photographing lens, a recording medium, a magnetic recording unit provided with a magnetic head, a base, an inner housing lid housing the recording medium and which can be moved into and out of contact with the magnetic head on the base, an outer lid located outside of the inner housing lid, and an image pickup element for converting an image made through the photographing lens into an electric signal. The circuit element mounting structure has a circuit base plate, on which is provided at least a circuit for recording an image on the recording medium and a circuit for driving the recording medium and the magnetic head, with the circuit base plate being disposed along a bottom of the base and a top of the inner housing lid.

6 Claims, 3 Drawing Sheets

CIRCUIT ELEMENT MOUNTING STRUCTURE FOR ELECTRONIC STILL CAMERA

BACKGROUND OF THE INVENTION

The present invention relates to a circuit element mounting structure for an electronic still camera.

A conventional electronic still camera, which converts an image into an electric signal and records it, requires not only an exposure control circuit as needed by a camera provided with a film coated with a silver salt, but also requires an image pickup and recording circuit. Therefore, the circuit base plate of the conventional electronic still camera is larger than that of a camera merely provided with a film coated with a silver salt. Accordingly, the conventional electronic still camera is larger in size than the latter camera. This is a problem for the conventional electronic still camera.

SUMMARY OF THE INVENTION

The present invention was made in order to solve the above-mentioned problem.

Accordingly, it is an object and feature of the present invention to provide a circuit element mounting structure which makes it possible to house a circuit base plate within a smaller space in an electronic still camera thereby to decrease the size of the electronic still camera.

The foregoing and other objects of the invention have been achieved by the provision of a magnetic recording unit of the electronic still camera which includes a base on which a drive mechanism for rotating a magnetic recording medium and a drive mechanism for moving a magnetic head are provided, an inner housing lid in which the magnetic recording medium is housed and which can be moved into and out of contact with the magnetic head on the base, and an outer lid located outside of the inner housing lid. The circuit element mounting structure is characterized by the circuit base plate, on which at least a circuit for recording an image on the magnetic recording medium and a circuit for driving the medium and the magnetic head are provided, is disposed along the bottom of the base and the top of the inner housing lid. Since a portion of the circuit base plate is housed between the inner housing lid and the outer lid, as contrasted to the conventional electronic still camera, a relatively large circuit base plate can be housed in the electronic still camera without increasing the size of the camera.

BRIEF DESCRIPTION OF THE DRAWINGS

The above and other objects, features, and advantages of this invention will become more apparent from the following detailed description when read in conjunction with the accompanying drawings in which.

DETAILED DESCRIPTION OF THE PREFERRED EMBODIMENT

An embodiment of the present invention is described hereafter in detail with reference to the drawings attached hereto.

Figure 4:
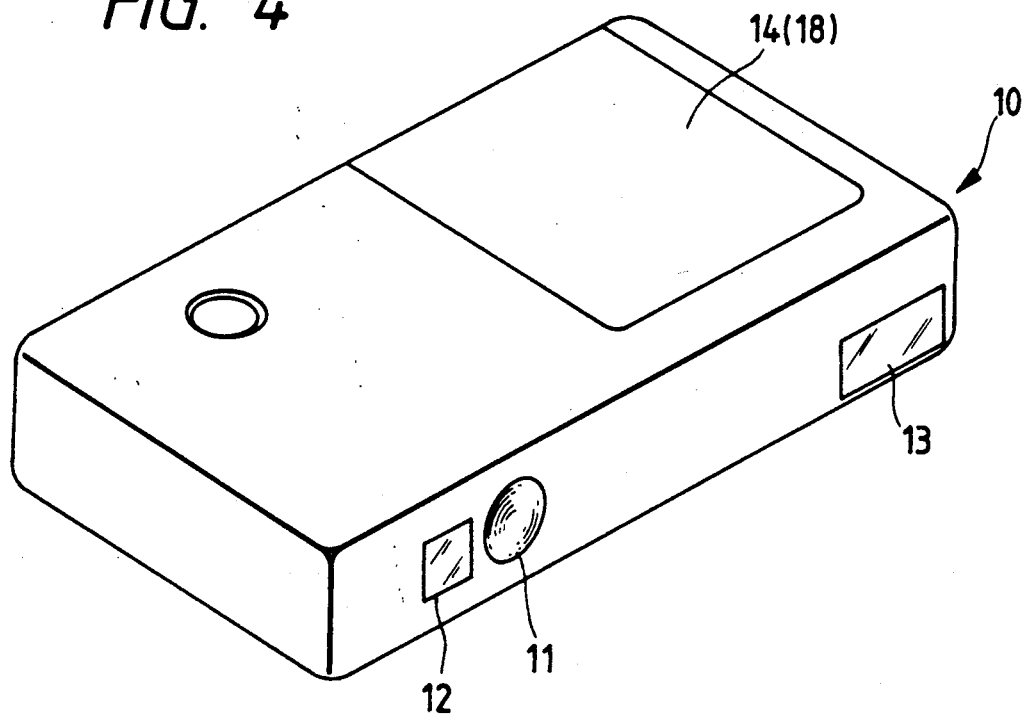
FIG. 4. is a perspective exterior view of the electronic still camera.
Figure 5:
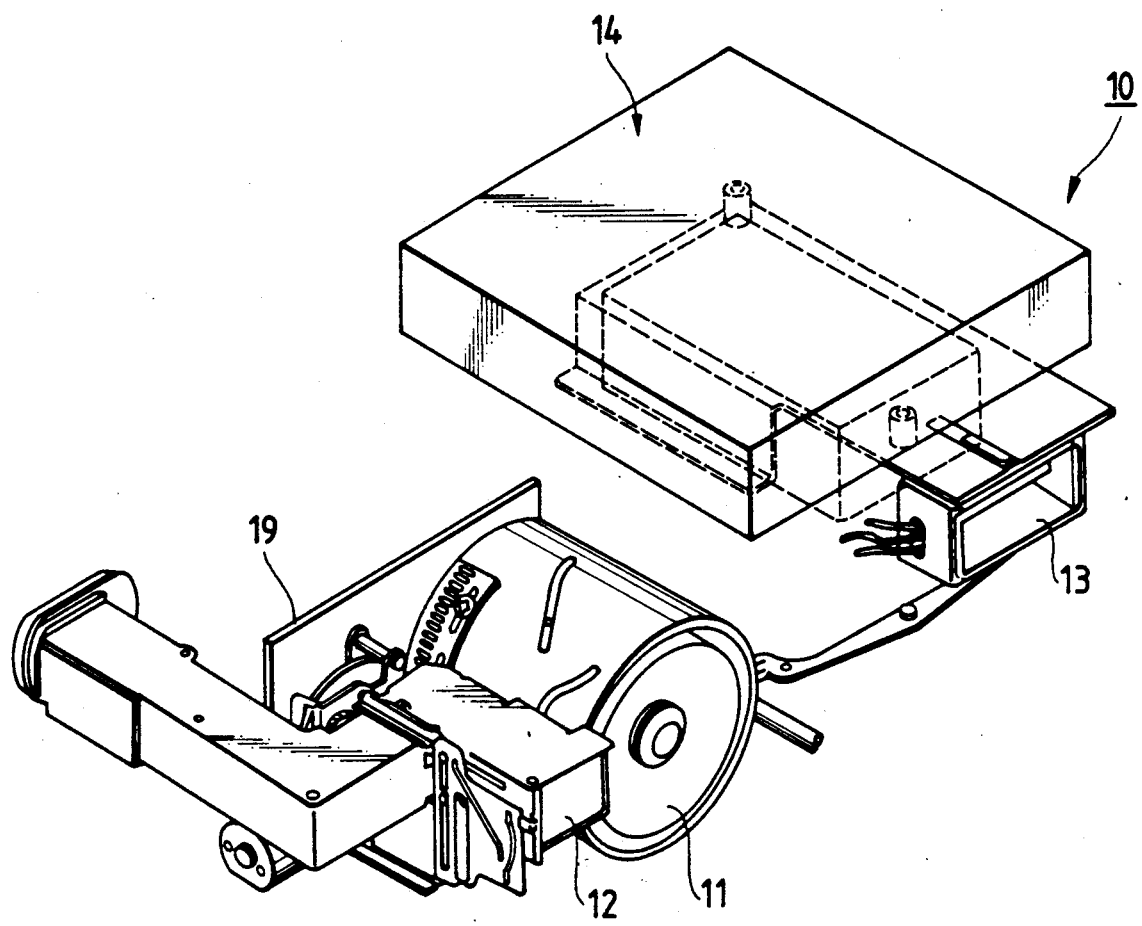
FIG. 5 is a perspective view of the internal components of the electronic still camera.

FIG. 4 shows the exterior of an electronic still camera 10 in which a circuit element mounting structure according to the present invention is provided. FIG. 5 shows the interior of the camera 10. In the camera 10, a finder 12 is located at a side of a photographing lens 11. A strobo unit is located at the other side of the lens 11. A magnetic recording unit 14 is provided over the strobo unit. An image pickup element mounting plate 19 is provided behind the lens 11.

Figure 1:
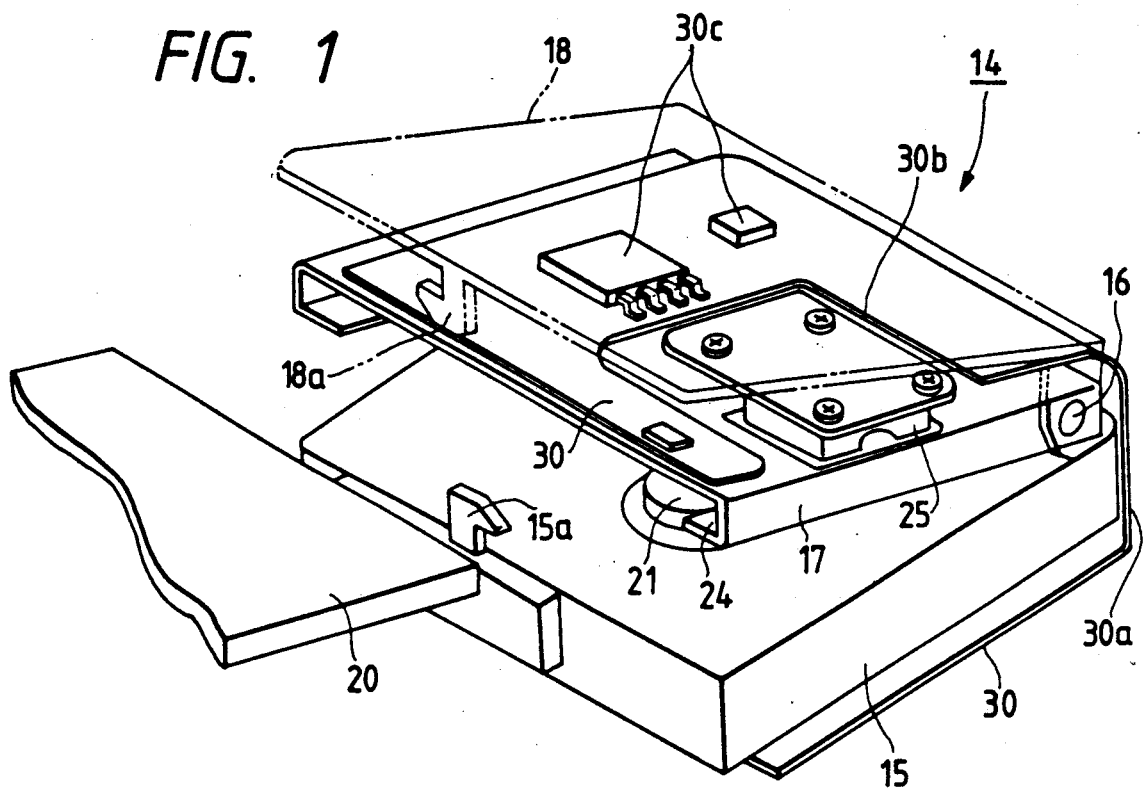
FIG. 1 is a perspective view of a major portion of a circuit element mounting structure for an electronic still camera which is an embodiment according to the present invention.
Figure 2:
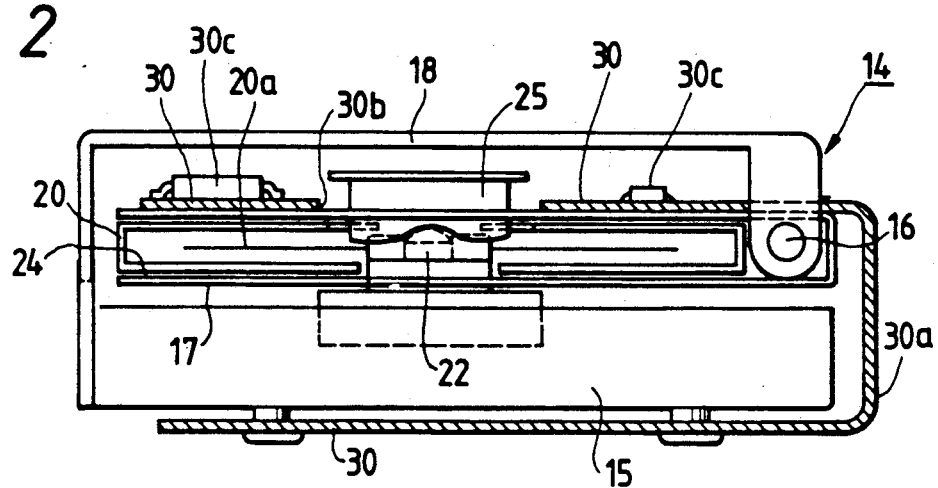
FIG. 2 is a sectional view of the circuit element mounting structure which is an embodiment of the present invention in the state when an inner housing lid and an outer lid are closed.
Figure 3:
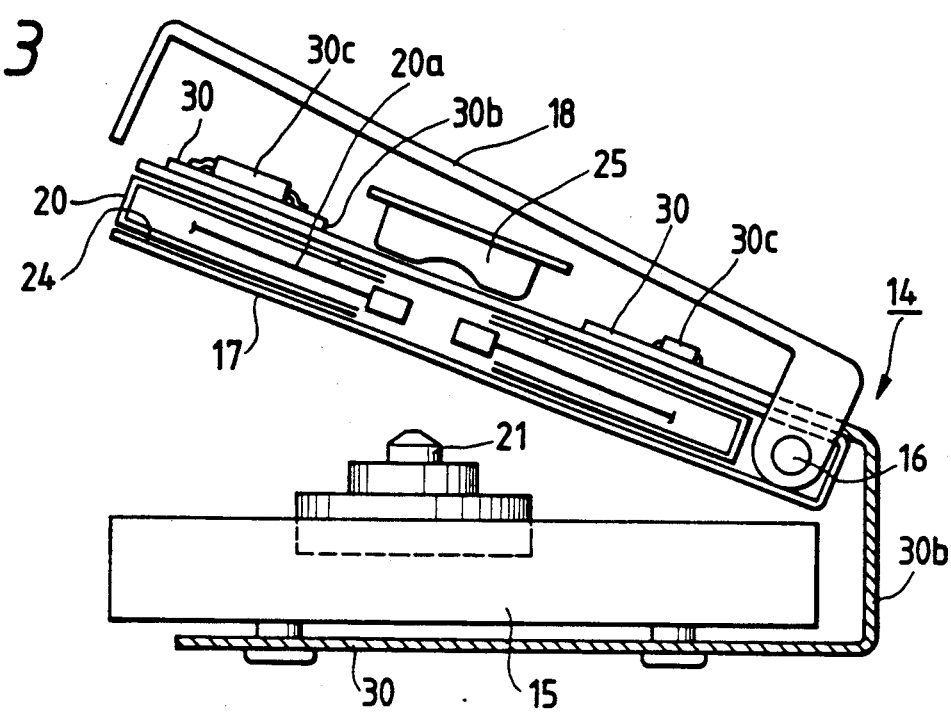
FIG. 3 is a sectional view of the circuit element mounting structure which is an embodiment of the present invention in the state when the inner housing lid and the outer lid are opened.

As shown in FIGS. 1, 2, and 3, the magnetic recording unit 14 includes a base 15, an inner housing lid 17 pivotally coupled to the rear portion of the base by shafts 16, and an outer lid 18 pivotally coupled to the rear portion of the base 15 by the shafts 16. A spindle 21 with a magnetic disk jacket 20 attached, a spindle drive mechanism for rotating the spindle 21, and a magnetic head drive mechanism for moving a magnetic head 22 in the radial direction of the jacket 20 are provided in the base 15. The front of the inner housing lid 17 has an opening 24, through which the magnetic disk jacket 20 is inserted into the lid and is removed therefrom. A stabilizing pad 25 is attached to the inner housing lid 17 and faces the magnetic head 22. The pad 25 enables a magnetic disk 20a in the jacket 20 to be put in stable contact with the magnetic head 22.

When the inner housing lid 17 is opened as shown in FIGS. 1 and 3, the stabilizing pad 25 is moved away from the lid 17 so as not to hinder the insertion and removal of the magnetic disk jacket 20 to and from the interior of the lid 17. When the inner housing lid 17 is closed, as shown in FIG. 2, the stabilizing pad 25 is moved toward the lid 17, thereby to put the magnetic disk 20a in the jacket 20 in stable contact with the magnetic head 22. Since the mechanism for moving the stabilizing pad 25 into and out of the inner housing lid 17 is not relevant to the spirit or essential character of the present invention, the mechanism is not described herein, and is not shown in the drawings. As shown in FIG. 1, the base 15 and the outer lid 18 are provided with hooks 15a and 18a, respectively, which are engaged with each other to keep the inner housing lid 17 in its closed position.

The circuit element mounting structure is characterized by a circuit base plate 30 provided along the bottom of the magnetic recording unit 14 and the top of the inner housing lid 17. At least the bent portion 30a of the circuit base plate 30, which extends from the bottom of the magnetic recording unit 14 to the top of the inner housing lid 17, is made flexible. The circuit base plate 30 has a notch 30b which is located over the inner housing lid 17 and which corresponds to the stabilizing pad 25 so that the pad 25 is not placed in contact with the circuit base plate 30. Circuit elements 30c, such as integrated circuit chips, are secured appropriately on the circuit base plate 30.

With the foregoing structure, a circuit element which generates noise in a signal, and another circuit element which would be affected by the noise, can be disposed separately, one on the portion of the circuit base plate 30 under the base 15 and the other on the portion of the circuit base plate 30 over the inner housing lid 17, so that the latter circuit element is not affected by the noise. For example, a circuit element which generates noise may be a drive circuit element for the spindle 21 and the magnetic head 22, and the circuit element which would be affected by the noise may be a recording circuit element for the magnetic disk 20a. Preferably, such different kinds of circuit elements are disposed separately on the portion of the circuit base plate 30 under the base 15 and on the other portion of the circuit base plate 30 over the inner housing lid 17, although the circuit elements are not always easily distinguishable.

Since the circuit base plate 30 is disposed not only under the base 15 but also over the inner housing lid 17, a circuit base plate with a relatively large size can be housed in a relatively small space. Additionally, since the rear bent portion 30a of the circuit base plate 30 is flexible, the plate does not hinder the opening and closing of the inner housing lid 17 and the outer housing lid 18.

While certain preferred embodiments have been shown and described, many changes and modifications within the spirit of the invention will be apparent to those of working skill in this technical field. Thus, the scope of the invention should be considered as limited only by the appended claims.

What is claimed is:

1. A circuit element mounting structure for an electronic still camera having a photographing lens, a magnetic recording unit having a base, a magnetic head on said base, an inner housing lid for housing a recording medium for moving said recording medium into and out of contact with the magnetic head on the base, an outer lid located outside of the inner housing lid, and an image pickup element for converting an image made through the photographing lens into an electric signal, said circuit element mounting structure comprising:

a circuit base plate supporting at least a portion of a circuit member relating to the electronic still camera, said circuit base plate being disposed along a bottom of the base and a top of said inner housing lid.

2. A circuit element mounting structure for an electronic still camera as defined in claim 1, wherein a circuit element which generates noise in a signal, and another circuit element which would be affected by the noise, can be disposed separately, one on the portion of said circuit base plate under said base and the other on the porpion of said circuit base plate over said inner housing lid.

3. A circuit element mounting structure for an electronic still camera as defined in claim 1, wherein said inner housing lid includes a stabilizing pad, and wherein said circuit base plate has a notch located over said stabilizing pad.

4. A circuit element mounting structure for an electronic still camera as defined in claim 1, wherein said circuit base plate has a flexible portion.

5. A circuit element mounting structure as defined in claim 4, wherein said flexible portion of said circuit base plate extends from a bottom of the magnetic recording unit to a top of the inner housing lid.

6. A circuit element mounting structure as defined in claim 1, wherein said circuit member comprises a circuit for recording an image on the recording medium and a circuit for driving the recording medium and the magnetic head.

* * * * *